US012557143B2

(12) United States Patent
Qiao et al.

(10) Patent No.: US 12,557,143 B2
(45) Date of Patent: Feb. 17, 2026

(54) DATA TRANSMISSION METHOD AND APPARATUS, BASE STATION, USER TERMINAL, AND ELECTRONIC DEVICE

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 375 days.

(21) Appl. No.: 18/252,273

(22) PCT Filed: Nov. 10, 2020

(86) PCT No.: PCT/CN2020/127887
§ 371 (c)(1),
(2) Date: May 9, 2023

(87) PCT Pub. No.: WO2022/099480
PCT Pub. Date: May 19, 2022

(65) Prior Publication Data
US 2023/0413330 A1    Dec. 21, 2023

(51) Int. Cl.
H04W 74/0816    (2024.01)
H04W 72/11      (2023.01)
H04W 74/02      (2009.01)

(52) U.S. Cl.
CPC ........ H04W 74/0816 (2013.01); H04W 72/11 (2023.01); H04W 74/02 (2013.01)

(58) Field of Classification Search
CPC . H04W 74/0816; H04W 72/11; H04W 74/02; H04W 16/14; H04W 88/06;
(Continued)

(56) References Cited

U.S. PATENT DOCUMENTS

2007/0195789 A1    8/2007    Yao
2016/0227564 A1    8/2016    Stephenne et al.
(Continued)

FOREIGN PATENT DOCUMENTS

CN    109451803 A    3/2019
CN    110381600 A    10/2019
(Continued)

OTHER PUBLICATIONS

WO_2021/161478_A1 (Year: 2021).*
(Continued)

Primary Examiner — Rushil P. Sampat
(74) Attorney, Agent, or Firm — Oblon, McClelland, Maier & Neustadt, L.L.P.

(57) ABSTRACT

The present application relates to the technical field of wireless communications, and provides a data transmission method and apparatus, a base station, a user terminal, and an electronic device. The solution includes: setting a transmission time window; determining a target transmission time unit in the transmission time window; sending a data packet to a user terminal in the target transmission time unit. In the present application, a base station can set a transmission time window, and then determine a target transmission time unit in the transmission time window, and send a data packet to a user terminal in the target transmission time unit. In this way, a base station sends a data packet to a user terminal in the target transmission time unit in the transmission time window, so that a data packet received by the user terminal aligns with a corresponding scheduling time domain resource, and the delay requirement for service transmission can be met.

20 Claims, 6 Drawing Sheets

(58) Field of Classification Search
CPC ... H04L 5/0032; H04L 5/0028; H04L 5/0044; H04L 5/0048; H04L 5/0092; H04L 5/001; H04L 5/0023; H04L 5/0057; Y02D 30/70
See application file for complete search history.

(56) References Cited

U.S. PATENT DOCUMENTS

| | | | | |
|---|---|---|---|---|
| 2020/0107285 | A1* | 4/2020 | Prakash | H04W 56/0045 |
| 2021/0167890 | A1* | 6/2021 | Lee | H04W 72/20 |
| 2021/0168781 | A1* | 6/2021 | Lee | G06N 3/04 |
| 2023/0354048 | A1* | 11/2023 | Kakishima | H04L 5/0092 |

FOREIGN PATENT DOCUMENTS

| | | |
|---|---|---|
| CN | 111757391 A | 10/2020 |
| CN | 111757521 A | 10/2020 |
| IN | 202027031634 A | 10/2020 |
| WO | WO 2019/213924 A1 | 11/2019 |

OTHER PUBLICATIONS

"DL SPS enhancement", OPPO, 3GPP TSG RAN WG1 #100-E, R1-2000485, Feb. 28, 2020, 3 pages.

International Search Report with English translation mailed on Aug. 10, 2021 in PCT/CN2020/127887 filed on Nov. 10, 2020 (citing references 1-2, 15-16, & 23 therein, 4 pages).

Combined Chinese Office Action and Search Report issued Feb. 28, 2025, in corresponding Chinese Patent Application No. 202080003137.6 (with English Translation) citing documents 1, 15-18 therein, 19 pages.

\* cited by examiner

DATA TRANSMISSION METHOD AND APPARATUS, BASE STATION, USER TERMINAL, AND ELECTRONIC DEVICE

CROSS-REFERENCE TO RELATED APPLICATIONS

The present application is a U.S. National Stage of International Application No. PCT/CN2020/127887, filed on Nov. 10, 2020, the contents of all of which are incorporated herein by reference in their entireties for all purposes.

TECHNICAL FIELD

The present disclosure relates to the field of wireless communication technologies, and in particular, to data transmission method, apparatus, base station, user terminal, electronic device and storage medium.

BACKGROUND

In the related art, a semi-persistent scheduling mechanism (SPS) has the advantages of a small number of signaling and low energy consumption of a terminal, and has been widely used in the field of wireless communication.

SUMMARY

According to a first aspect of the embodiment of the disclosure, there is provided a data transmission method, which is applied to a base station and includes: setting a transmission time window; determining a target transmission time unit in the transmission time window; sending a data packet to the user terminal in the target transmission time unit.

In some embodiments, the transmission time window is applied to semi-static scheduling.

In some embodiments, the semi-static scheduling includes semi-persistent scheduling or configuration grant scheduling.

In some embodiments, said setting the transmission time window includes at least any one of the following: determining the cycle of the transmission time window; determining the start position of the transmission time window; and determining the length of the transmission time window.

In some embodiments, the cycle of the transmission time window is determined according to the service cycle.

In some embodiments, said determining the target transmission time unit in the transmission time window includes: determining available transmission time unit in the transmission time window; and determining the target transmission time unit in the available transmission time unit.

In some embodiments, at least one of the start position of the transmission time window, the length of the transmission time window, and the available transmission time unit is determined according to at least one factor among the link status of the core network, server processing capability, service characteristics, service cycle and the service delay requirement.

In some embodiments, said determining the available transmission time unit in the transmission time window includes: determining a part of the transmission time units within the transmission time window as the available transmission time unit.

In some embodiments, the method further includes: setting an indication signal according to the target transmission time unit, where the indication signal is used to indicate whether the user terminal needs to perform data packet receiving and decoding operations in the available transmission time unit, and the target transmission time unit is the available transmission time unit that the user terminal needs to perform the data packet receiving and decoding operations; and sending the indication signal to the user terminal.

In some embodiments, the indication signal is a front indication signal; the front indication signal is located in front of the transmission time window; or the front indication signal is located in front of corresponding single available transmission time unit in the transmission time window.

In some embodiments, the indication signal is an embedded indication signal; the embedded indication signal is located in front of all the available transmission time units within the transmission time window; or the embedded indication signal is located within corresponding single available transmission time unit in the transmission time window.

In some embodiments, the front indication signal is located in front of all the available transmission time units in the transmission time window, and is used to indicate whether the user terminal needs to perform the packet receiving and decoding operations in corresponding single available transmission time unit or all the available transmission time units; or the front indication signal is located in front of the corresponding single available transmission time unit in the transmission time window, and is used to indicate whether the user terminal needs to perform the data packet receiving and decoding operations in the corresponding available transmission time unit.

In some embodiments, the embedded indication signal is located in front of all the available transmission time units in the transmission time window, and the embedded indication signal is used to indicate whether the user terminal needs to perform the packet receiving and decoding operations in the corresponding single available transmission time unit or all the available transmission time units; or the embedded indication signal is located within the corresponding single available transmission time unit in the transmission time window, and the embedded indication signal is used to indicate whether the user terminal needs to perform the data packet receiving and decoding operations in the corresponding available transmission time unit.

In some embodiments, the method further includes: sending at least one of the transmission time window, the available transmission time unit, the type of the indication signal, and the location of the indication signal to the user terminal.

In some embodiments, the method further includes: determining one of a set of preset type of indication signals as the type of the indication signal; or determining the type of the indication signal specified in the preset protocol as the type of the indication signal.

In some embodiments, the available transmission time units corresponding to different user terminals or different scheduling tasks of the same user terminal overlap; the locations of the indication signals are different or at least one of the contents and locations of the indication signals are different.

In some embodiments, the length of the transmission time window is less than the length of the cycle of the transmission time window.

According to a second aspect of the embodiment of the disclosure, there is provided another data transmission method, which is applied to a user terminal. The method includes: performing data packet receiving and decoding operations within a transmission time window.

In some embodiments, the transmission time window is applied to semi-static scheduling.

In some embodiments, the semi-static scheduling includes semi-persistent scheduling or configuration grant scheduling.

In some embodiments, performing the data packet receiving and decoding operations within the transmission time window includes: performing the packet receiving and decoding operations in available transmission time units within the transmission time window.

In some embodiments, the method further includes: in response to successfully receiving the data packet, stopping performing the data packet receiving and decoding operations in subsequent available transmission time units within the transmission time window.

In some embodiments, performing the data packet receiving and decoding operations in available transmission time units within the transmission time window includes: receiving an indication signal sent by the base station, and performing the data packet receiving and decoding operations in the target transmission time unit within the transmission time window according to the indication signal, where the indication signal is used to indicate whether the user terminal needs to perform the data packet receiving and decoding operations in the available transmission time unit, and the target transmission time unit is the available transmission time unit in which the user terminal needs to perform the data packet receiving and decoding operations within the transmission time window.

In some embodiments, the method further includes: determining, according to the indication signal, whether the corresponding available transmission time unit is the target transmission time unit; or, according to whether the indication signal is successfully received, determining whether the corresponding available transmission time unit is the target transmission time unit.

In some embodiments, the method further includes: receiving the transmission time window, the available transmission time unit, the type of the indication signal and the location of the indication signal sent by the base station.

In some embodiments, the length of the transmission time window is less than the length of the cycle of the transmission time window.

According to a third aspect of the embodiment of the disclosure, there is provided a data transmission device, which is applied to a base station, and includes: a first setting module configured to set a transmission time window; a first determining module configured to determine a target transmission time unit in the transmission time window; a sending module, configured to send a data packet to the user terminal within the target transmission time unit.

In some embodiments, the transmission time window is applied to semi-static scheduling.

In some embodiments, the semi-static scheduling includes semi-persistent scheduling or configuration grant scheduling.

In some embodiments, the first setting module includes: a first determining unit, the first determining unit is configured to determine the cycle of the transmission time window, determine the start position of the transmission time window, and determine the length of the transmission time window.

In some embodiments, the cycle of the transmission time window is determined according to the service cycle.

In some embodiments, the first determining module includes: a second determining unit configured to determine available transmission time units in the transmission time window; a third determining unit configured to determine the target transmission time unit in the available transmission time units.

In some embodiments, at least one of the start position of the transmission time window, the length of the transmission time window, and the available transmission time unit is determined according to at least one factor among link status of the core network, server processing capability, service characteristics, service cycle and service delay requirement.

In some embodiments, the second determining unit is further configured to determine a part of the transmission time units within the transmission time window as the available transmission time units.

In some embodiments, the data transmission device further includes: a second setting module, the second setting module is configured to set an indication signal according to the target transmission time unit, where the indication signal is used to indicate whether the user terminal needs to perform the data packet receiving and decoding operations in the available transmission time unit, and the target transmission time unit is the available transmission time unit in which the user terminal needs to perform the data packet receiving and decoding operations; the sending module is further configured to send the indication signal to the user terminal.

In some embodiments, the indication signal is a front indication signal; the front indication signal is located in front of the transmission time window; or, the front indication signal is located in front of a corresponding single available transmission time unit in the transmission time window.

In some embodiments, the indication signal is an embedded indication signal; the embedded indication signal is located in front of all the available transmission time units within the transmission time window; or the embedded indication signal is located within a corresponding single available transmission time unit in the transmission time window.

In some embodiments, the front indication signal is located in front of the transmission time window, and is used to indicate whether the user terminal needs to perform the data packet receiving and decoding operations in a corresponding single available transmission time unit or all the available transmission time units; or, the front indication signal is located in front of the corresponding single available transmission time unit in the transmission time window, and is used to indicate whether the user terminal needs to perform the data packet receiving and decoding operations in the corresponding available transmission time unit.

In some embodiments, the embedded indication signal is located in front of all the available transmission time units in the transmission time window, and is used to indicate whether the user terminal needs to perform the packet receiving and decoding operations in the corresponding single available transmission time unit or all the available transmission time units; or, the embedded indication signal is located within the corresponding single available transmission time unit in the transmission time window, and is used to indicate whether the user terminal needs to perform the data packet receiving and decoding operations in the corresponding available transmission time unit.

In some embodiments, the sending module is further configured to send at least one of the transmission time window, the available transmission time unit, the type of the indication signal, and the location of the indication signal to the user terminal.

In some embodiments, the data transmission device further includes: a second determining module, where the second determining module is configured to determine one of a set of preset type of indication signals as the type of the indication signal; or, determining the type of the indication signal specified in the preset protocol as the type of the indication signal.

In some embodiments, the available transmission time units corresponding to different user terminals or different scheduling tasks of the same user terminal overlap; the locations of the indication signals are different, or at least one of contents and locations of the indication signals are different.

In some embodiments, the length of the transmission time window is less than the length of the cycle of the transmission time window.

According to a fourth aspect of the embodiment of the disclosure, there is provided a data transmission device, which is applied to a user terminal, and includes: a executing module configured to perform data packet receiving and decoding operations within a transmission time window.

In some embodiments, the transmission time window is applied to semi-static scheduling.

In some embodiments, the semi-static scheduling includes semi-persistent scheduling or configuration grant scheduling.

In some embodiments, the executing module is further configured to perform the data packet receiving and decoding operations in available transmission time units within the transmission time window.

In some embodiments, the data transmission device further includes: a response module, the response module is configured to, in response to successfully receiving the data packet, stop performing the packet receiving and decoding operations in subsequent available transmission time units within the transmission time window.

In some embodiments, the executing module includes: a receiving unit, configured to receive the indication signal sent by the base station; an executing unit configured to perform the data packet receiving and decoding operations in a target transmission time unit within the transmission time window according to the indication signal, the indication signal is used to indicate whether the user terminal needs to perform data packet receiving and decoding operations in the available transmission time unit, and the target transmission time unit is the available transmission time unit within the transmission time window in which the user terminal needs to perform the data packet receiving and decoding operations.

In some embodiments, the data transmission device further includes: a third determining module, the third determining module is configured to determine whether the corresponding available transmission time unit is the target transmission time unit according to the indication signal; or, according to whether the indication signal is successfully received, determine whether the corresponding available transmission time unit is the target transmission time unit.

In some embodiments, the data transmission device further includes: a receiving module, the receiving module is configured to receive the transmission time window, the available transmission time unit, the type of the indication signal and the location of the indication signal.

In some embodiments, the length of the transmission time window is less than the length of the cycle of the transmission time window.

According to a fifth aspect of the embodiment of the disclosure, there is provided a base station, including the data transmission device described in the third aspect of the embodiment of the disclosure.

According to a sixth aspect of the embodiment of the disclosure, there is provided a user terminal, including the data transmission device described in the fourth aspect of the embodiment of the disclosure.

According to a seventh aspect of the embodiment of the disclosure, there is provided an electronic device, including: at least one processor; and a memory communicatively connected to the at least one processor; wherein, the memory stores instructions that can be executed by the at least one processor. The instructions are executed by the at least one processor, so that the at least one processor can execute the data transmission method described in the first aspect of the embodiment of the disclosure, or the data transmission method described in the second aspect of the embodiment of the disclosure.

According to a eighth aspect of the embodiment of the disclosure, there is provided a computer-readable storage medium storing computer instructions, where the computer instructions are used to cause the computer to execute the data transmission method described in the first aspect of the embodiment of the disclosure, or the data transmission method described in the second aspect of the embodiment of the disclosure.

Additional aspects and advantages of the present disclosure will be set forth, in part, in the following description, and in part will be apparent from the following description, or learned by practice of the present disclosure.

BRIEF DESCRIPTION OF THE DRAWINGS

The above and/or additional aspects and advantages of the present disclosure will become apparent and readily understood from the following description of embodiments taken in conjunction with the accompanying drawings, wherein.

DETAILED DESCRIPTION

Figure 1:
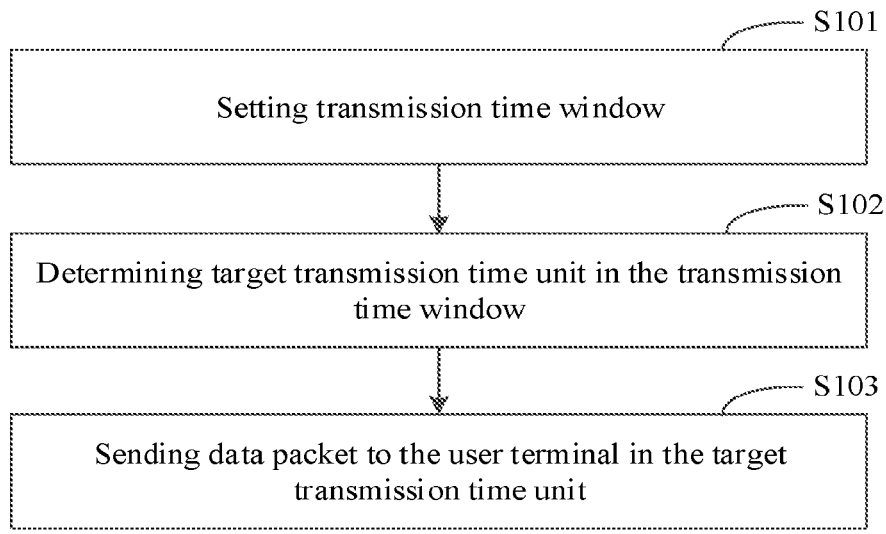
FIG. 1 is a schematic diagram of a data transmission method provided by an embodiment of the present disclosure.

Here, a detailed explanation will be given to exemplary embodiments, examples of which are illustrated in the accompanying drawings. When the following description involves the accompanying drawings, unless otherwise indicated, the same reference numbers in different drawings represent the same or similar elements. The implementations described in the following exemplary embodiments do not represent all implementations consistent with the present disclosure. Instead, they are merely examples of apparatuses and methods consistent with certain aspects of the present disclosure, as detailed in the appended claims.

Terms used in the present disclosure are only for the purpose of describing specific embodiments and not intended to limit the present disclosure. "A", "an", "said", and "the" in a singular form in the present disclosure and the appended claims are intended to include a plural form as well, unless the context clearly indicated otherwise. It should also be understood that term "and/or" as used herein refers to and encompasses any and all possible combinations of one or more of the associated listed items.

It should be understood that, although the terms first, second, third and the like may be adopted to describe various information in the present disclosure, such information should not be limited to these terms. For example, without departing from the scope of the present disclosure, first information may also be referred to as second information, and similarly, second information may also be referred to as first information. The word "if" used here may be explained as "while" or "when" or "in response to determining that", which depends on the context.

The following describes in detail the embodiments of the present disclosure, examples of which are illustrated in the accompanying drawings, wherein the same or similar reference numerals refer to the same or similar elements throughout. The embodiments described below with reference to the accompanying drawings are exemplary, and are intended to be used to explain the present disclosure, but should not be construed as a limitation to the present disclosure.

In the related art, when the semi-persistent scheduling mechanism is used for data transmission, due to the influence of factors such as the transmission link of the core network equipment, transmission service characteristics, etc., a delay is likely to occur when the data packet arrives at the base station, causing that the data packet on the access network (RAN) side cannot be aligned with the semi-persistent scheduling time domain resources configured for it, and cannot meet the delay requirement of service transmission.

The data transmission method, apparatus, base station, user terminal, electronic device and storage medium provided by the present disclosure will be described in detail below with reference to the accompanying drawings.

FIG. 1 is a schematic diagram of a data transmission method provided by an embodiment of the present disclosure.

As shown in FIG. 1, the data transmission method of the embodiment of the present disclosure includes the following steps: S101, setting a transmission time window.

It should be noted that, the data transmission method according to the embodiment of the present disclosure is performed by the base station.

In the data transmission method in the related art, due to the influence of factors such as the transmission link of the core network equipment, transmission service characteristics, etc., the data packet is prone to time delay when it arrives at the base station, resulting in that the data packet cannot be aligned with the configured semi-static time domain resource at the access network (RAN) side, which cannot meet the delay requirement of service transmission.

In order to solve the above problem, in the embodiment of the present disclosure, the base station may set a transmission time window. The transmission time window may include a plurality of transmission time units (Slots).

In some embodiments, the transmission time window may be applied to semi-static scheduling, and the semi-static scheduling includes semi-persistent scheduling (SPS) or configuration grant scheduling.

In some embodiments, the base station may set a periodic transmission time window.

In the embodiment of the present disclosure, setting the transmission time window includes at least any one of the following: determining the cycle of the transmission time window, determining the start position of the transmission time window, and determining the length of the transmission time window.

In some embodiments, the cycle of the transmission time window may be determined according to the service cycle.

In some embodiments, the start position of the transmission time window and the length of the transmission time window can be determined according to at least one factor among the link status of the core network, server processing capability, service characteristics, service cycle, and service delay requirements.

In some embodiments, the length of the transmission time window may be smaller than the length of the cycle of the transmission time window.

In specific implementation, the base station may set the transmission time window by at least one of radio resource control (RRC) signaling, downlink control information (DCI) signaling, and MAC Control Element (MAC CE) signaling. For the case where the base station sets the transmission time window through various signaling, when all of RRC signaling, MAC CE signaling and DCI signaling carry related parameter configurations of the transmission time window, and the configurations for the same parameter are inconsistent, data transmission is performed with parameter configuration carried by DCI signaling; when RRC signaling and MCE CE signaling carry related parameter configurations of the transmission time window, and the configurations for the same parameter are inconsistent, data transmission is performed with parameter configuration carried by MAC CE signaling; when RRC signaling and DCI signaling carry related parameter configurations of the transmission time window, and the configurations for the same parameter are inconsistent, data transmission is performed with parameter configuration carried by DCI signaling; when MAC CE signaling and DCI signaling carry related parameter configurations of the transmission time window, and the configurations for the same parameter are inconsistent, data transmission is performed with parameter configuration carried by DCI signaling.

S102: Determining a target transmission time unit in the transmission time window.

It should be noted that the transmission time window may include a plurality of transmission time units. Transmission time units can be divided into target transmission time unit and non-target transmission time unit. The target transmission time unit refers to the transmission time unit in which data packets needs to be sent, and the non-target transmission time unit refers to the transmission time unit in which data packets does not need to be sent.

In the embodiment of the present disclosure, after setting the transmission time window, the base station may determine the target transmission time unit in the transmission time window during each data transmission. It can be understood that, the target transmission time unit in the transmission time window may be one or more.

In some embodiments, the target transmission time unit is determined according to the time when the data packet from the core network arrives at the base station and the processing capability of the base station.

S103: Sending the data packet to the user terminal within the target transmission time unit.

In the embodiment of the present disclosure, after determining the target transmission time unit in the transmission time window, the base station may send a data packet to a user terminal (UE) within the target transmission time unit. The user terminals include but are not limited to mobile phones, computers, smart wearable devices, smart home appliances, vehicle-mounted terminals, etc., which are not limited here.

According to the data transmission method of the embodiment of the present disclosure, the base station can set the transmission time window, and then can determine the target transmission time unit in the transmission time window, and send the data packet to the user terminal within the target transmission time unit. Therefore, the base station sends data packets to the user terminal in the target transmission time unit within the transmission time window, so that the data packets received by the user terminal are aligned with the corresponding scheduling time domain resource, which can meet the delay requirement of service transmission.

Figure 2:
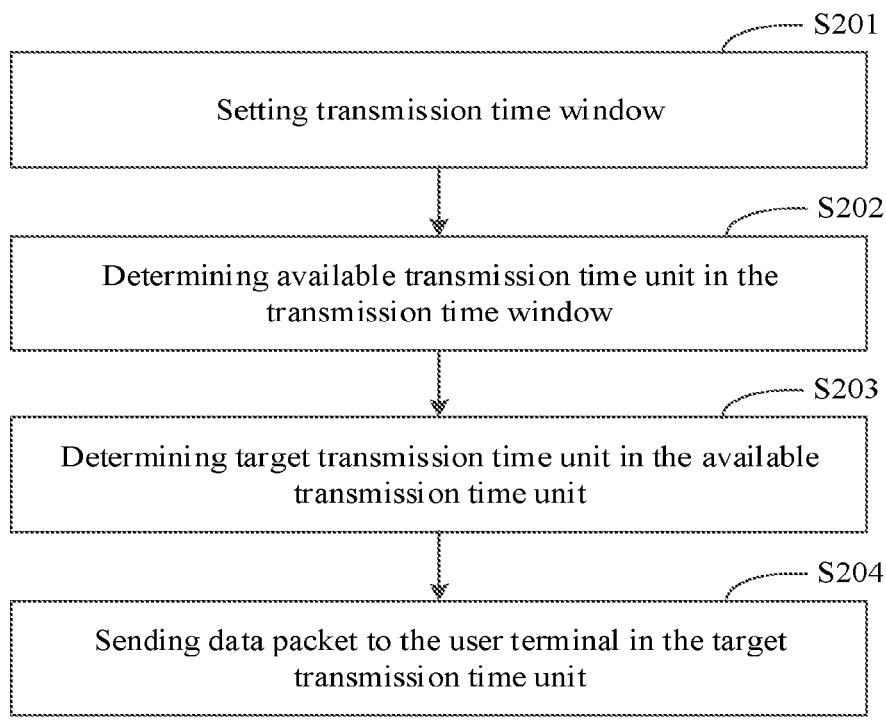
FIG. 2 is a schematic diagram of another data transmission method provided by an embodiment of the present disclosure.

FIG. 2 is a schematic diagram of another data transmission method provided by an embodiment of the present disclosure. The data transmission method according to the embodiment of the present disclosure is performed by the base station.

As shown in FIG. 2, the data transmission method of the embodiment of the present disclosure includes the following steps.

S201, Setting a transmission time window.

Step S201 is the same as step S101 and will not be repeated here.

S202: Determining available transmission time unit in the transmission time window.

It should be noted that the transmission time window may include a plurality of transmission time units. Transmission time units can be divided into available transmission time unit and non-available transmission time unit. The available transmission time unit refers to the transmission time unit in which data packet can be sent, and the unusable transmission time unit refers to the transmission time unit in which data packets cannot be sent.

In the embodiment of the present disclosure, after setting the transmission time window, the base station may determine the available transmission time unit in the transmission time window. It can be understood that the available transmission time unit in the transmission time window may be one or more.

In some embodiments, the available transmission time unit may be determined according to at least one factor among the link status of the core network, the processing capability of the server, the service characteristic, the service cycle, and the service delay requirement.

In some embodiments, determining the available transmission time unit in the transmission time window may include determining a part of the transmission time units in the transmission time window as available transmission time units.

As another possible embodiment, determining the available transmission time unit in the transmission time window may include determining all the transmission time units in the transmission time window as available transmission time units.

S203: Determine a target transmission time unit in the available transmission time units.

In the embodiment of the present disclosure, after determining the available transmission time unit in the transmission time window, the base station may further determine the target transmission time unit in the available transmission time unit during each data transmission.

In some embodiments, the target transmission time unit may be determined according to the arrival time of the data packet from the core network and the processing capability of the base station.

S204, sending the data packet to the user terminal within the target transmission time unit.

Step S204 is the same as step S103 and will not be repeated here.

According to the data transmission method of the embodiment of the present disclosure, the base station can set the transmission time window, and then can determine the available transmission time unit in the transmission time window, and determine the target transmission time unit in the available transmission time unit, and send data packets to the user terminal within the target transmission time unit. Therefore, the base station sends data packets to the user terminal in the target transmission time unit within the transmission time window, so that the data packets received by the user terminal are aligned with the corresponding scheduling time domain resources, which can meet the delay requirement of service transmission.

Figure 3:
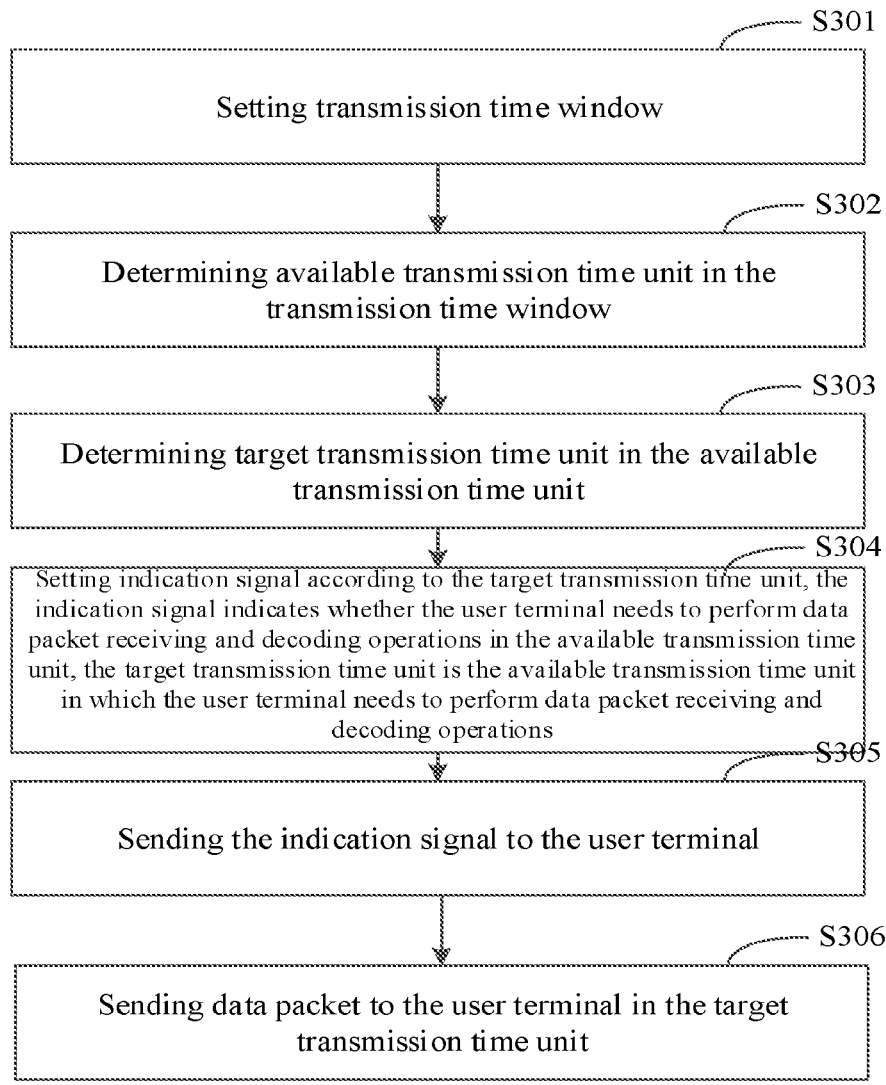
FIG. 3 is a schematic diagram of another data transmission method provided by an embodiment of the present disclosure.

FIG. 3 is a schematic diagram of another data transmission method provided by an embodiment of the present disclosure. The data transmission method according to the embodiment of the present disclosure is performed by the base station.

As shown in FIG. 3, the data transmission method of the embodiment of the present disclosure includes the following steps.

S301, Setting a transmission time window.

S302: Determining available transmission time unit in the transmission time window.

S303: Determining the target transmission time unit in the available transmission time window.

For the related content of steps S301 to S303, reference may be made to the foregoing embodiments, which will not be repeated here.

S304, Setting the indication signal according to the target transmission time unit. The indication signal is used to indicate whether the user terminal needs to perform data packet receiving and decoding operations in the available transmission time unit, and the target transmission time unit is available transmission time unit in which the user terminal needs to perform the data packet receiving and decoding operations.

In the embodiment of the present disclosure, the base station can also set an indication signal according to the target transmission time unit, and the indication signal is used to indicate whether the user terminal needs to perform data packet receiving and decoding operations in the available transmission time unit, and the target transmission time unit is available transmission time unit in which the user terminal needs to perform packet receiving and decoding operations.

S305, Sending the indication signal to the user terminal.

In the embodiment of the present disclosure, before sending the data packet to the user terminal within the target transmission time unit, the base station may send the indication signal to the user terminal, and notify the user terminal of the indication signal in time, so that the user terminal can perform data packet receiving and decoding operations according to the indication signal.

In some embodiments, the base station may also send at least one of the transmission time window, the available transmission time unit, the type of the indication signal, and the location of the indication signal to the user terminal, and timely inform the user terminal of at least one of the transmission time window, the available transmission time unit, the type of the indication signal and the location of the indication signal, and the user terminal performs data packet receiving and decoding operations according to the at least one of the above information.

The signaling carrying at least one of the above information may be RRC signaling, DCI signaling, and MAC CE signaling. For the case where the base station sets at least one of the above information through various signaling, when all of RRC signaling, MAC CE signaling and DCI signaling carry related parameter configurations of the transmission time window, and the configurations for the same parameter are inconsistent, data transmission is performed with parameter configuration carried by DCI signaling; when RRC signaling and MCE CE signaling carry related parameter configurations of the transmission time window, and the configurations for the same parameter are inconsistent, data transmission is performed with parameter configuration carried by MAC CE signaling; when RRC signaling and DCI signaling carry related parameter configurations of the transmission time window, and the configurations for the same parameter are inconsistent, data transmission is performed with parameter configuration carried by DCI signaling; when MAC CE signaling and DCI signaling carry related parameter configurations of the transmission time window, and the configurations for the same parameter are inconsistent, data transmission is performed with parameter configuration carried by DCI signaling.

In some embodiments, determining the type of the indication signal may include determining one of a set of the preset types of indication signals as the type of the indication signal, or, determining the type of the indication signal specified in the preset protocol as the type of the indication signal.

The preset type of indication signal may include front indication signal and embedded indication signal.

The content related to the front indication signal and the embedded indication signal provided by the present disclosure will be described in detail below.

When the indication signal is a front indication signal, the indication signal may be located in front of the transmission time window, or the indication signal may be located in front of a corresponding single available transmission time unit within the transmission time window. The following two possible implementations can be included:

Implementation 1: The front indication signal is located in front of the transmission time window, and is used to indicate whether the user terminal needs to perform data packet receiving and decoding operations in a corresponding single available transmission time unit or all available transmission time units.

In some embodiments, the front indication signal may be downlink control information signaling or an orthogonal sequence signal.

In the embodiment of the present disclosure, when the indication signal is a front indication signal, the indication signal includes an indication bit (Bitmap), and when the indication signal is located in front of the transmission time window, the indication bit is used to indicate whether the user terminal needs to perform packet receiving and decoding operations in the corresponding single available transmission time unit or all available transmission time units.

In some embodiments, the indication bit may indicate whether the user terminal needs to perform data packet receiving and decoding operations in a corresponding single available transmission time unit or all available transmission time units through a number of 0 or 1. For example, when the indication bit is 1, it can be used to indicate that the user terminal needs to perform data packet receiving and decoding operations in the corresponding single available transmission time unit or all available transmission time units; on the contrary, when the indication bit is 0, it can be used to indicate that the user terminal does not need to perform packet receiving and decoding operations in corresponding single available transmission time unit or all available transmission time units.

It is understood that the number of indication bit may be one or more.

For example, when the front indication signal is located in front of the transmission time window, if the transmission time window includes 4 available transmission time units, the front indication signal may include 4 indication bits, which are respectively used to indicate whether the user terminal needs to perform packet receiving and decoding operations in 4 available transmission time units.

Alternatively, in the case that the number of indication bits is 1, but there are a plurality of available transmission time units, when the indication bit is 1, it can be used to indicate that the user terminal needs to perform data packets receiving and decoding operations in all available transmission time units within the transmission time window, conversely, when the indication bit is 0, it can be used to indicate that the user terminal does not need to perform packet receiving and decoding operations in all available transmission time units within the transmission time window.

Implementation 2: The front indication signal is located in front of the corresponding single available transmission time unit in the transmission time window, and is used to indicate whether the user terminal needs to perform data packet receiving and decoding operations in the corresponding available transmission time unit.

In some embodiments, the front indication signal may be downlink control information signaling or an orthogonal sequence signal.

In the embodiment of the present disclosure, when the indication signal is a front indication signal, the indication signal includes an indication bit, and when the indication signal is located in front of a single available transmission time unit corresponding to the transmission time window, the indication bit is used to indicate whether the user terminal needs to be perform packet receiving and decoding operations in the corresponding available transmission time unit.

In some embodiments, the indication bit may use a number 0 or 1 to indicate whether the user terminal needs to perform data packet receiving and decoding operations in the corresponding available transmission time unit. For example, when the indication bit is 1, it can be used to indicate that the user terminal needs to perform data packet receiving and decoding operations in the corresponding available transmission time unit; on the contrary, when the indication bit is 0, it can be used to indicate that the user terminal does not need to perform data packet receiving and decoding operations in the corresponding available transmission time unit.

It can be understood that the number of indication bits is one.

For example, when the front indication signal is located in front of the corresponding single available transmission time unit in the transmission time window, if the transmission time window includes 4 available transmission time units, then there is a indication signal in front of each single available transmission time unit in the transmission time window, each indication signal may include one indication bit, which is used to indicate whether the user terminal needs to perform data packet receiving and decoding operations in the corresponding available transmission time unit.

When the indication signal is an embedded indication signal, the embedded indication signal may be located in front of all available transmission time units within the transmission time window, or the embedded indication signal may be located within a corresponding single available transmission time unit within the transmission time window. The following two possible implementations can be included:

Implementation 1: The embedded indication signal is located in front of all available transmission time units in the transmission time window, and is used to indicate whether the user terminal needs to perform data packet receiving and decoding operations in the corresponding single available transmission time unit or all available transmission time units.

In some embodiments, the embedded indication signal may be downlink control information signaling or an orthogonal sequence signal.

In the embodiment of the present disclosure, when the indication signal is an embedded indication signal, the embedded indication signal includes an indication bit, and when the embedded indication signal is located in front of all available transmission time units in the transmission time window, the indication bit is used to indicate whether the user terminal needs to perform packet receiving and decoding operations in corresponding single available transmission time unit or all available transmission time units.

In some embodiments, the indication bit may indicate whether the user terminal needs to perform data packet receiving and decoding operations in a corresponding single available transmission time unit or all available transmission time units through a number of 0 or 1. For example, when the indication bit is 1, it can be used to indicate that the user terminal needs to perform data packet receiving and decoding operations in the corresponding single available transmission time unit or all available transmission time units; on the contrary, when the indication bit is 0, it can be used to indicate that the user terminal does not need to perform packet receiving and decoding operations in corresponding single available transmission time unit or all available transmission time units.

It can be understood that the number of indication bits may be one or more.

For example, when the embedded indication signal is located in front of all available transmission time units in the transmission time window, if the transmission time window includes 4 available transmission time units, the indication signal may include 4 indication bits, which are respectively used to indicate whether the user terminal needs to perform packet receiving and decoding operations in the above 4 available transmission time units.

Alternatively, in the case that the number of indication bits is 1, but there are a plurality of available transmission time units, when the indication bit is 1, it can be used to indicate that the user terminal needs to perform data packets receiving and decoding operations in all available transmission time units within the transmission time window, conversely, when the indicator bit is 0, it can be used to indicate that the user terminal does not need to perform packet receiving and decoding operations in all available transmission time units within the transmission time window.

Implementation 2: The embedded indication signal is located in a corresponding single available transmission time unit within the transmission time window, and is used to indicate whether the user terminal needs to perform data packet receiving and decoding operations in the corresponding available transmission time unit.

In some embodiments, the embedded indication signal may be downlink control information signaling or an orthogonal sequence signal.

In the embodiment of the present disclosure, when the indication signal is an embedded indication signal, the indication signal includes an indication bit, and when the indication signal is located in a corresponding single available transmission time unit within the transmission time window, the indication bit is used to indicate whether the user terminal needs to perform data packet receiving and decoding operations in the corresponding available transmission time unit.

In some embodiments, the indication bit may use a number 0 or 1 to indicate whether the user terminal needs to perform data packet receiving and decoding operations in the corresponding available transmission time unit. For example, when the indication bit is 1, it can be used to indicate that the user terminal needs to perform data packet receiving and decoding operations in the corresponding available transmission time unit; on the contrary, when the indication bit is 0, it can be used to indicate that the user terminal does not need to perform data packet receiving and decoding operations in the corresponding available transmission time unit.

It can be understood that the number of indication bits is one.

For example, when the embedded indication signal is located in a corresponding single available transmission time unit within the transmission time window, if the transmission time window includes 4 available transmission time units, then there is an indication signal in each single available transmission time unit in the transmission time window. Each indication signal may include one indication bit, which is used to indicate whether the user terminal needs to perform data packet receiving and decoding operations in the corresponding available transmission time unit.

S306: Sending the data packet to the user terminal within the target transmission time unit.

Step S306 is the same as step S103 and will not be repeated here.

According to the data transmission method of the embodiment of the present disclosure, the base station can set the transmission time window, and then can determine the available transmission time unit in the transmission time window, and determine the target transmission time unit in the available transmission time unit, and then can set the indication signal according to the target transmission time unit. The indication signal is used to indicate whether the user terminal needs to perform data packet receiving and decoding operations in the available transmission time unit, and then the indication signal can be sent to the user terminal, and the data packet is sent to the user terminal within the target transmission time unit. Thus, the base station can instruct whether the user terminal needs to perform data packet receiving and decoding operations in the available transmission time unit through the indication signal, and send the data packet to the user terminal in the target transmission time unit within the transmission time window, so that the data packet received by the user terminal are aligned with the corresponding scheduling time domain resources, which can meet the delay requirement of service transmission.

It can be understood that, in order to improve the spectral efficiency, when the base station determines the transmission time window and the available transmission time units in the transmission time window, the available transmission time units corresponding to different user terminals or different scheduling tasks of the same user terminal may overlap, but it is necessary to ensure that data transmissions between different user terminals or different scheduling tasks of the same user terminal do not conflict, and it is necessary to guarantee the delay requirements of services.

In some embodiments, when the transmission time units corresponding to different user terminals or different scheduling tasks of the same user terminal overlap, it is necessary to distinguish the indication signals configured by different user terminals or different scheduling tasks of the same user terminal. The locations of the indication signals are different, or at least one of the contents or the locations of the indication signals are different.

Figure 4:
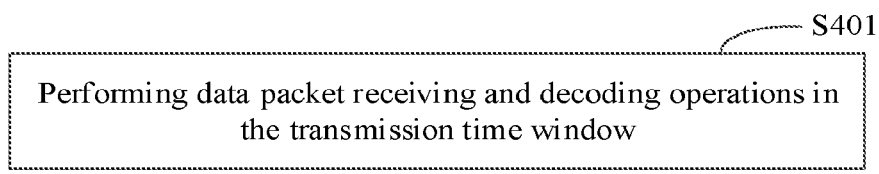
FIG. 4 is a schematic diagram of another data transmission method provided by an embodiment of the present disclosure.

FIG. 4 is a schematic diagram of another data transmission method provided by an embodiment of the present disclosure.

As shown in FIG. 4, the data transmission method of the embodiment of the present disclosure includes the following steps.

S401, Performing data packet receiving and decoding operations within the transmission time window.

It should be noted that, the data transmission method of the embodiment of the present disclosure is performed by the user terminal. The user terminal includes but are not limited to mobile phones, computers, smart wearable devices, smart home appliances, vehicle-mounted terminals, etc., which are not limited here.

In the data transmission method in the related art, due to the influence of factors such as the transmission link of the core network equipment, transmission service characteristics, etc., the data packet is prone to time delay when it arrives at the base station, resulting in that the data packet cannot be aligned with the configured scheduling time domain resources at the access network (RAN) side, which cannot meet the delay requirement of service transmission.

In order to solve the above problem, in the embodiment of the present disclosure, the base station may set a transmission time window.

In some embodiments, the transmission time window may be applied to semi-static scheduling, and semi-static scheduling includes semi-persistent scheduling or configuration grant scheduling.

In some embodiments, the length of the transmission time window may be smaller than the length of the cycle of the transmission time window.

In the embodiment of the present disclosure, the user terminal may perform data packet receiving and decoding operations within the transmission time window.

In some embodiments, performing data packet receiving and decoding operations within the transmission time window may include performing physical downlink shared channel (PDSCH) decoding within the transmission time window. If the physical downlink shared channel decoding is successful, the packet receiving operation may be performed.

In the data transmission method of the embodiment of the present disclosure, the user terminal can perform data packet receiving and decoding operations within the transmission time window, so that the received data packets are aligned with the corresponding scheduling time domain resources, which can meet the delay requirement of service transmission.

Figure 5:
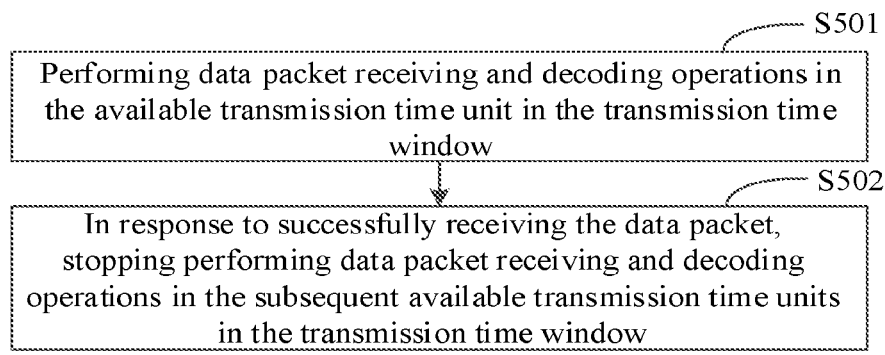
FIG. 5 is a schematic diagram of another data transmission method provided by an embodiment of the present disclosure.

FIG. 5 is a schematic diagram of another data transmission method provided by an embodiment of the present disclosure. The data transmission method of the embodiment of the present disclosure is performed by the user terminal.

As shown in FIG. 5, the data transmission method of the embodiment of the present disclosure includes the following steps.

S501, Performing data packet receiving and decoding operations in available transmission time unit within the transmission time window.

It should be noted that the transmission time window may include a plurality of transmission time units. Transmission time units can be divided into available transmission time unit and non-available transmission time unit. Among them, the available transmission time unit refers to the transmission time unit in which data packets can be sent, and it is also the transmission time unit in which data packets can be received, and the non-available transmission time unit refers to the transmission time unit in which data packets cannot be sent, and it is also the transmission time unit that data packet cannot be received.

In the embodiment of the present disclosure, the user terminal may perform data packet receiving and decoding operations in available transmission time unit within the transmission time window. It is understood that the available transmission time unit within the transmission time window may be one or more.

S502, in response to successfully receiving the data packet, stopping performing data packet receiving and decoding operations in subsequent available transmission time unit within the transmission time window.

In the embodiment of the present disclosure, after performing the data packet receiving and decoding operations in the available transmission time unit within the transmission time window, the user terminal may stop performing data packet receiving and decoding operations in the subsequent available transmission time unit within the transmission time window in response to successfully receiving the data packet, to reduce the energy consumption of the user terminal.

For example, if the transmission time window includes 4 available transmission time units, and the user terminal successfully receives the data packet when performing the data packet receiving and decoding operations in the first available transmission time unit of the above 4 available transmission time units, then the user terminal stops performing data packet receiving and decoding operations in the subsequent 3 available transmission time units within the transmission time window in response to successfully receiving the data packet.

As another possible implementation, after the user terminal performs the data packet receiving and decoding operations in the available transmission time unit within the transmission time window, in response to successfully receiving the data packet, the user terminal may continue performing the data packet receiving and decoding operations in the subsequent available transmission time units within the transmission time window.

According to the data transmission method of the embodiment of the present disclosure, the user terminal performs data packet receiving and decoding operations in the available transmission time unit within the transmission time window, and can stop performing data receiving and decoding operations in subsequent available transmission time units within the transmission time window in response to successfully receiving the data packet. Therefore, the user terminal performs packet receiving and decoding operations in the available transmission time units within the transmission time window, and the received data packets are aligned with the corresponding scheduling time domain resources, which can meet the delay requirement of service transmission; and the user terminal may stop performing data packet receiving and decoding operations in subsequent available transmission time unit within the transmission time window in response to successfully receiving the data packet, which can reduce the energy consumption of the user terminal.

Figure 6:
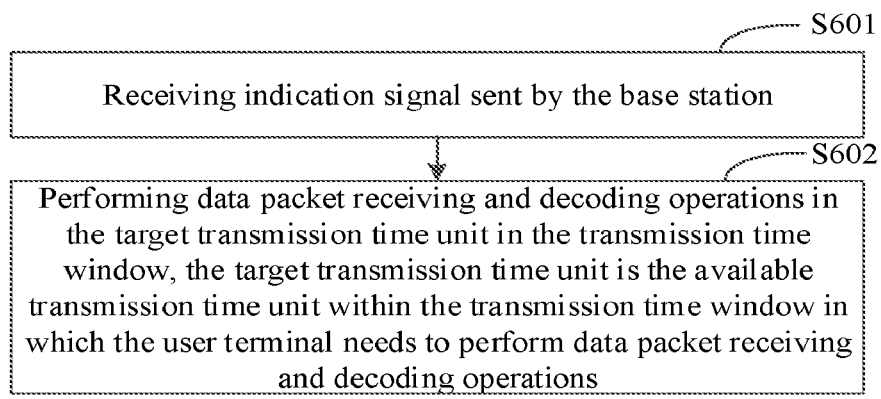
FIG. 6 is a schematic diagram of another data transmission method provided by an embodiment of the present disclosure.

FIG. 6 is a schematic diagram of another data transmission method provided by an embodiment of the present disclosure. The data transmission method of the embodiment of the present disclosure is performed by the user terminal.

As shown in FIG. 6, the data transmission method of the embodiment of the present disclosure includes the following steps.

S601, Receiving an indication signal sent by a base station.

In some embodiments, the user terminal can also receive the transmission time window, the available transmission time unit, the type of the indication signal, and the location of the indication signal sent by the base station, so as to perform data packet receiving and decoding operations according to the transmission time window, the available transmission time unit, the type of the indication signal and the location of the indication signal.

Wherein, the types of indication signals may include front indication signals and embedded indication signals. It should be noted that, for the related content of the front indication signal and the embedded indication signal, reference may be made to the foregoing embodiments, and details are not repeated here.

S602, according to the instruction signal, performing data packet receiving and decoding operations in a target transmission time unit within the transmission time window. The target transmission time unit is an available transmission time unit within the transmission time window in which the user terminal needs to perform data packet receiving and decoding operations.

It should be noted that the available transmission time units can be divided into target transmission time unit and non-target transmission time unit. The target transmission time unit refers to an available transmission time unit within the transmission time window in which the user terminal needs to perform packet receiving and decoding operations, and the non-target transmission time unit refers to an available transmission time window within the transmission time window in which the user terminal does not need to perform packet receiving and decoding operations.

In the embodiment of the present disclosure, the user terminal may perform data packet receiving and decoding operations in the target transmission time unit within the transmission time window according to the indication signal. Two possible implementations can be included as follows.

Implementation 1: Determining whether the corresponding available transmission time unit is the target transmission time unit according to the indication signal.

In the embodiment of the present disclosure, the indication signal includes an indication bit, and the indication bit is used to instruct the user terminal to determine whether the corresponding available transmission time unit is the target transmission time unit. Further, the user terminal may determine whether the corresponding available transmission time unit is the target transmission time unit according to the indication bit in the indication signal.

In some embodiments, the indication bit may use a number 0 or 1 to instruct the user terminal to determine whether the corresponding available transmission time unit is the target transmission time unit. For example, when the indication bit is 1, the user terminal may determine that the corresponding available transmission time unit is the target transmission time unit; on the contrary, when the indication bit is 0, the user terminal may determine that the corresponding available transmission time unit is the non-target transmission time unit.

Implementation 2: Determining whether the corresponding available transmission time unit is the target transmission time unit according to whether the indication signal is successfully received.

In some embodiments, determining whether the corresponding available transmission time unit is the target transmission time unit according to whether the indication signal is successfully received may include, in response to successfully receiving the indication signal, determining that the corresponding available transmission time unit is the target transmission time unit; and on the contrary, in response to unsuccessfully receiving the indication signal, determine that the corresponding available transmission time unit is a non-target transmission time unit.

As another possible implementation, determining whether the corresponding available transmission time unit is the target transmission time unit according to whether the indication signal is successfully received, may further include, in response to successfully receiving the indication signal, determining that the corresponding available transmission time unit is non-target transmission time unit; and on the contrary, in response to unsuccessfully receiving the indication signal, determining that the corresponding available transmission time unit is the target transmission time unit.

According to the data transmission method of the embodiment of the present disclosure, the user terminal can receive the indication signal sent by the base station, and perform data packet receiving and decoding operations in the target transmission time unit within the transmission time window according to the indication signal. Therefore, the user terminal can perform data packet receiving and decoding operations in the target transmission time unit within the transmission time window according to the indication signal, and the received data packets are aligned with the corresponding scheduling time domain resources, which can meet the delay requirement of service transmission.

Figure 7:
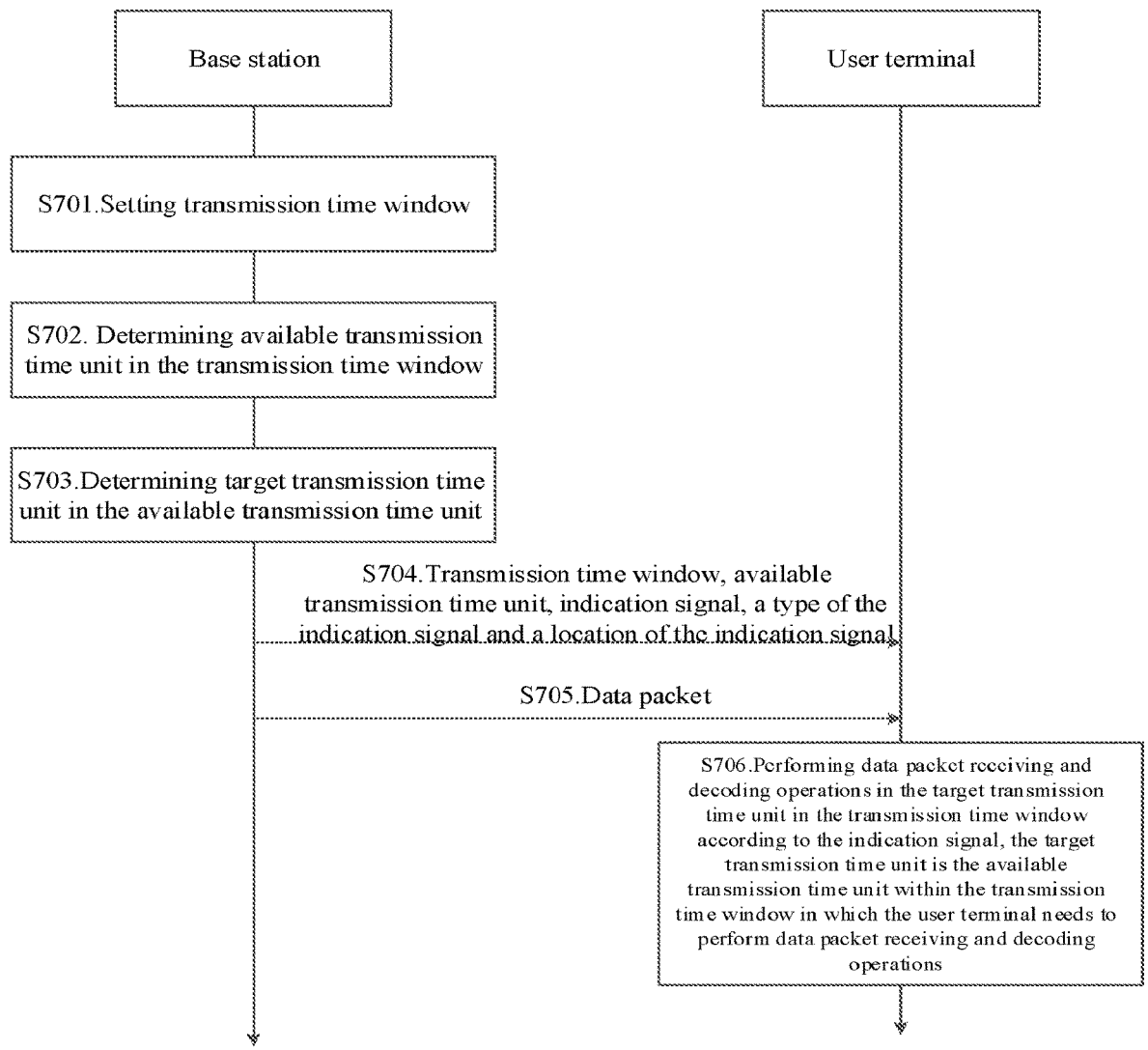
FIG. 7 is an interactive schematic diagram of a data transmission method provided by an embodiment of the present disclosure.

FIG. 7 is an interactive schematic diagram of a data transmission method provided by an embodiment of the present disclosure. The data transmission method of the embodiment of the present disclosure is respectively performed by the base station and the user terminal.

As shown in FIG. 7, the data transmission method of the embodiment of the present disclosure includes the following steps.

S701, the base station sets a transmission time window.

S702, the base station determines available transmission time unit in the transmission time window.

S703, the base station determines a target transmission time unit in the available transmission time units.

S704, the base station sends at least one of the transmission time window, the available transmission time unit, the indication signal, the type of the indication signal, and the location of the indication signal to the user terminal.

S705, the base station sends the data packet to the user terminal within the target transmission time unit.

S706, the user terminal performs the data packet receiving and decoding operations in the target transmission time unit within the transmission time window according to the indication signal, and the target transmission time unit is an available transmission time unit within the transmission time window in which the user terminal needs to perform the data packet receiving and decoding operations.

For the related content of step S701-step S706, reference may be made to the foregoing embodiment, and details are not repeated here.

Figure 8:
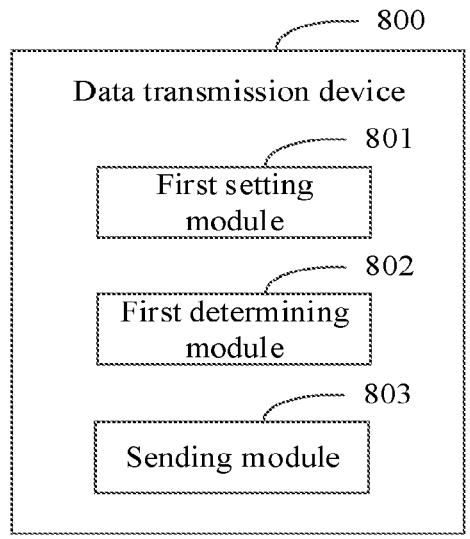
FIG. 8 is a schematic structural diagram of a data transmission device according to an embodiment of the present disclosure.
Figure 9:
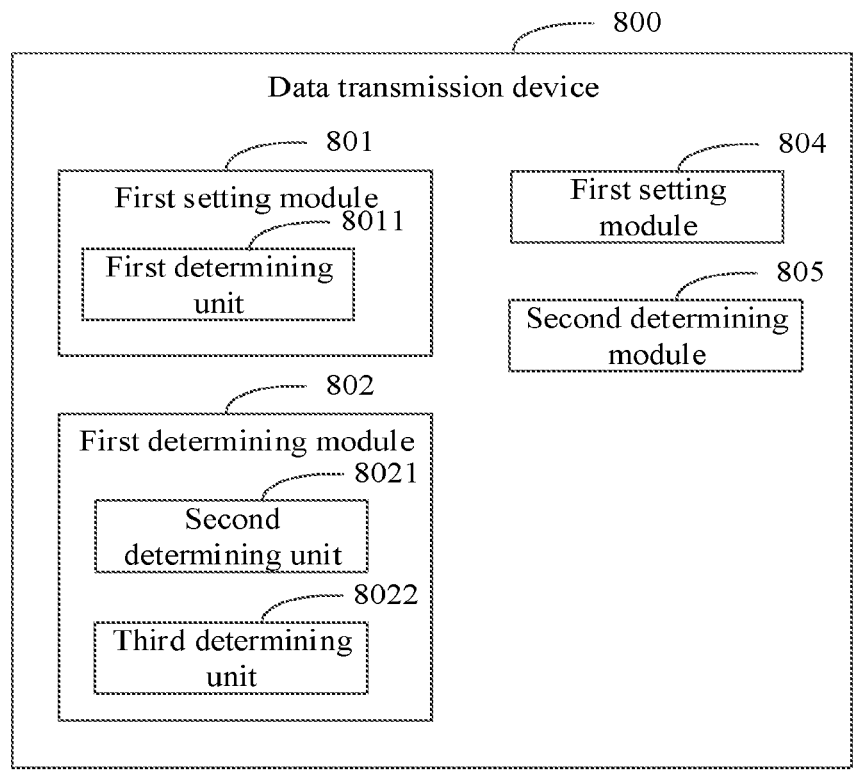
FIG. 9 is a schematic structural diagram of another data transmission device provided by an embodiment of the present disclosure.

Corresponding to the data transmission methods provided by the above-mentioned embodiments, the present disclosure further provides a data transmission device. Since the data transmission device provided by the embodiments of the present disclosure corresponds to the data transmission methods provided by the above-mentioned embodiments of FIG. 1 to FIG. 3, the implementation of the data transmission method is also applicable to the data transmission device provided in this embodiment, which will not be described in detail in this embodiment. FIGS. 8-9 are schematic structural diagrams of a data transmission device proposed in the present disclosure.

FIG. 8 is a schematic structural diagram of a data transmission device according to an embodiment of the present disclosure.

As shown in FIG. 8, the data transmission device 800, applied to a base station, includes: a first setting module 801, a first determining module 802, and a sending module 803.

The first setting module 801 is configured to set the transmission time window.

The first determining module 802 is configured to determine a target transmission time unit in the transmission time window.

The sending module 803 is configured to send the data packet to the user terminal within the target transmission time unit.

In some embodiments, the transmission time window is applied to semi-static scheduling.

In some embodiments, the semi-static scheduling includes semi-persistent scheduling or configuration grant scheduling.

In some embodiments, as shown in FIG. 9, the first setting module 801 includes: a first determining unit 8011, the first determining unit 8011 is configured to determine the cycle of the transmission time window, determine the start position of the transmission time window, and the length of the transmission time window.

In some embodiments, the cycle of the transmission time window is determined according to the service cycle.

In some embodiments, as shown in FIG. 9, the first determining module 802 includes: a second determining unit 8021, configured to determine available transmission time unit in the transmission time window; a third determining unit 8022 is configured to determine a target transmission time unit in the available transmission time unit.

In some embodiments, at least one of the start position of the transmission time window, the length of the transmission time window, and the available transmission time unit is determined according to at least one factor among link status of the core network, server processing capability, service characteristics, service cycle and service delay requirement.

In some embodiments, the second determining unit 8021 is further configured to determine a part of the transmission time units within the transmission time window as the available transmission time units.

In some embodiments, as shown in FIG. 9, the data transmission device 800 further includes: a second setting module 804, the second setting module 804 is configured to set an indication signal according to the target transmission time unit, the indication signal is used to indicate whether the user terminal needs to perform data packet receiving and decoding operations in the available transmission time unit, and the target transmission time unit is available transmission time unit in which the user terminal needs to perform the data packet receiving and decoding operations; and the sending module 803 is further configured to send the indication signal to the user terminal.

In some embodiments, the indication signal is a front indication signal; the front indication signal is located in front of the transmission time window; or, the front indication signal is located in front of a corresponding single available transmission time unit within the transmission time window.

In some embodiments, the indication signal is an embedded indication signal; the embedded indication signal is located in front of all the available transmission time units within the transmission time window; or the embedded indication signal is located within a corresponding single available transmission time unit within the transmission time window.

In some embodiments, the front indication signal is located in front of the transmission time window, and is used to indicate whether the user terminal needs to perform the data packet receiving and decoding operations in a corresponding single available transmission time units or all the available transmission time units; or, the front indication signal is located in front of the corresponding single available transmission time unit in the transmission time window, and is used to indicate whether the user terminal needs to perform the data packet receiving and decoding operations in the corresponding available transmission time unit.

In some embodiments, the embedded signal is located in front of all the available transmission time units in the transmission time window, and is used to indicate whether the user terminal needs to perform the packet receiving and decoding operations in a corresponding single available transmission time unit or all the available transmission time units; or, the embedded indication signal is located in the corresponding single available transmission time unit in the transmission time window, and is used to indicate whether the user terminal needs to perform the data packet receiving and decoding operations in the corresponding available transmission time unit.

In some embodiments, the sending module 803 is further configured to send at least one of the transmission time window, the available transmission time unit, the type of the indication signal, and the location of the indication signal to the user terminal.

In some embodiments, as shown in FIG. 9, the data transmission device 800 further includes: a second determining module 805, the second determining module 805 is configured to determine one of a set of the preset type of indication signals as the type of the indication signal; or, determine the type of the indication signal specified in the preset protocol as the type of the indication signal.

In some embodiments, the available transmission time units corresponding to different user terminals or different scheduling tasks of the same user terminal overlap; the locations of the indication signals are different, or at least one of contents and locations of the indication signals are different.

In some embodiments, the length of the transmission time window is less than the length of the cycle of the transmission time window.

According to the data transmission device of the embodiment of the present disclosure, a transmission time window can be set, and then a target transmission time unit in the transmission time window can be determined, and a data packet can be sent to the user terminal within the target transmission time unit. Therefore, the base station sends data packets to the user terminal in the target transmission time unit within the transmission time window, so that the data packets received by the user terminal are aligned with the corresponding scheduling time domain resources, which can meet the delay requirement of service transmission.

Figure 10:
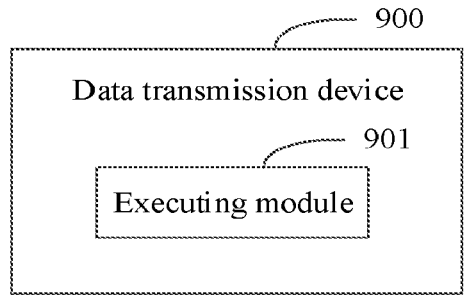
FIG. 10 is a schematic structural diagram of another data transmission device provided by an embodiment of the present disclosure.
Figure 11:
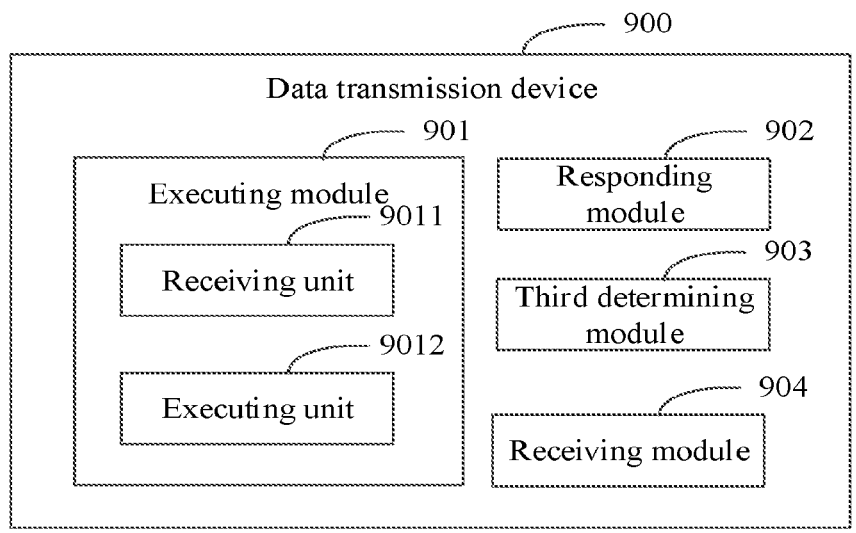
FIG. 11 is a schematic structural diagram of another data transmission device provided by an embodiment of the present disclosure.

Corresponding to the data transmission methods provided by the above-mentioned embodiments, the present disclosure further provides a data transmission device. Since the data transmission device provided by the embodiments of the present disclosure corresponds to the data transmission methods provided by the above-mentioned embodiments of FIG. 4 to FIG. 6, the implementation of the data transmission method is also applicable to the data transmission device provided in this embodiment, which will not be described in detail in this embodiment. FIGS. 10-11 are schematic structural diagrams of a data transmission device proposed in the present disclosure.

FIG. 10 is a schematic structural diagram of another data transmission device provided by an embodiment of the present disclosure.

As shown in FIG. 10, the data transmission device 900, applied to a user terminal, includes: an executing module 901, wherein the executing module 901 is configured to perform data packet receiving and decoding operations within the transmission time window.

In some embodiments, the transmission time window is applied to semi-static scheduling.

In some embodiments, the semi-static scheduling includes semi-persistent scheduling or configuration grant scheduling.

In some embodiments, the executing module 901 is further configured to perform the data packet receiving and decoding operations in an available transmission time unit within the transmission time window.

In some embodiments, as shown in FIG. 11, the data transmission device 900 further includes: a responding module 902, the responding module 902 is configured to stop performing the data packet receiving and decoding operations in the subsequent available transmission time unit in the transmission time window in response to successfully receiving the data packet.

In some embodiments, as shown in FIG. 11, the executing module 901 includes: a receiving unit 9011, configured to receive an indication signal sent by a base station; an executing unit 9012 is configured to perform the data packet receiving and decoding operations in the target transmission time unit within the transmission time window according to the indication signal, the indication signal is used to indicate whether the user terminal needs to perform data packet receiving and decoding operations in the available transmission time unit, and the target transmission time unit is an available transmission time unit within the transmission time window in which the user terminal needs to perform the data packet receiving and decoding operations.

In some embodiments, as shown in FIG. 11, the data transmission device 900 further includes: a third determining module 903, where the third determining module 903 is configured to determine whether the corresponding available transmission time is the target transmission time unit according to the indication signal; or determine whether the corresponding available transmission time unit is the target transmission time unit according to whether the indication signal is successfully received.

In some embodiments, as shown in FIG. 11, the data transmission device 900 further includes: a receiving module 904, the receiving module 904 is configured to receive the transmission time window, the available transmission time unit, the type of the indication signal and the location of the indication signal.

In some embodiments, the length of the transmission time window is less than the length of the cycle of the transmission time window.

According to the data transmission device of the embodiment of the present disclosure, data packet receiving and decoding operations can be performed within the transmission time window, so that the received data packets are aligned with the corresponding scheduling time domain resources, which can meet the delay requirement of service transmission.

According to an embodiment of the present disclosure, the present disclosure further provides a base station, including the data transmission device provided by the above-mentioned embodiments of FIG. 8 to FIG. 9.

According to the base station of the embodiment of the present disclosure, the base station can set a transmission time window, and then can determine a target transmission time unit in the transmission time window, and send a data packet to the user terminal within the target transmission time unit. Therefore, the base station sends data packets to the user terminal in the target transmission time unit within the transmission time window, so that the data packets received by the user terminal are aligned with the corresponding scheduling time domain resources, which can meet the delay requirement of service transmission.

According to an embodiment of the present disclosure, the present disclosure further provides a user terminal, including the data transmission device provided by the above-mentioned embodiments of FIG. 10 to FIG. 11.

According to the user terminal of the embodiment of the present disclosure, the user terminal can perform data packet receiving and decoding operations within the transmission time window, so that the received data packets are aligned with the corresponding scheduling time domain resources, which can meet the delay requirement of service transmission.

According to the embodiments of the present disclosure, the present disclosure further provides an electronic device and a readable storage medium.

Figure 12:
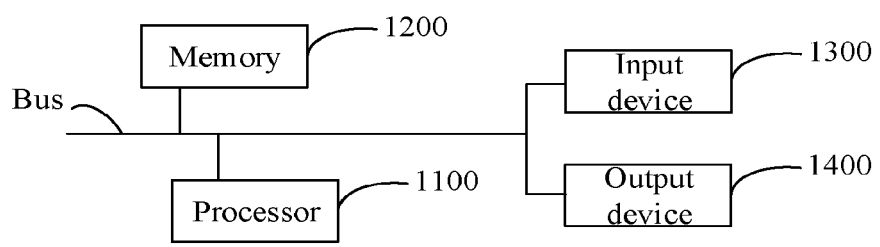
FIG. 12 is a schematic diagram of an electronic device according to an embodiment of the present disclosure.

As shown in FIG. 12, it is a block diagram of an electronic device according to an embodiment of the present disclosure. Electronic devices are intended to represent various forms of digital computers, such as laptops, desktops, workstations, personal digital assistants, servers, blade servers, mainframe computers, and other suitable computers. Electronic devices may also represent various forms of mobile devices, such as personal digital processors, cellular phones, smart phones, wearable devices, and other similar computing devices. The components shown herein, their connections and relationships, and their functions are by way of example only, and are not intended to limit implementations of the application described and/or claimed herein.

As shown in FIG. 12, the electronic device includes: one or more processors 1100, a memory 1200, and interfaces for connecting various components, including a high-speed interface and a low-speed interface. The various components are interconnected using different buses and may be mounted on a common motherboard or otherwise as desired. The processor may process instructions executed within the electronic device, including instructions stored in or on memory to display graphical information of the GUI on an external input/output device, such as a display device coupled to the interface. In other embodiments, a plurality of processors and/or a plurality of buses may be used with a plurality of memories and a plurality of memories, if desired. Likewise, a plurality of electronic devices may be connected, each providing some of the necessary operations (e.g., as a server array, a group of blade servers, or a multiprocessor system). A processor 1100 is taken as an example in FIG. 12.

The memory 1200 is the non-transitory computer-readable storage medium provided by the present disclosure. Wherein, the memory stores instructions executable by at least one processor, so that the at least one processor executes the data transmission method provided by the present disclosure. The non-transitory computer-readable storage medium of the present disclosure stores computer instructions for causing a computer to execute the data transmission method provided by the present disclosure.

As a non-transitory computer-readable storage medium, the memory 1200 can be used to store non-transitory software programs, non-transitory computer-executable programs, and modules, such as program instructions/modules corresponding to the data transmission method in the embodiments of the present disclosure (for example, the first setting module 801, the first determining module 802 and the sending module 803 shown in FIG. 8). The processor 1100 executes various functional applications and data processing of the server by running the non-transitory software programs, instructions and modules stored in the memory 1200, i.e., implements the data transmission method in the above method embodiments.

The memory 1200 may include a storage area for program and a storage area for data, wherein the storage area for program may store an operating system, an application program required by at least one function; the storage area for data may store data created according to the use of the electronic device, and the like. Additionally, memory 1200 may include high-speed random access memory, and may also include non-transitory memory, such as at least one magnetic disk storage device, flash memory device, or other non-transitory solid state storage device. In some embodiments, the memory 1200 may include memory located remotely relative to the processor 1100, and these remote memories may be connected to the electronic device through a network. Examples of such network include, but are not limited to, the Internet, an intranet, a local area network, a mobile communication network, and combinations thereof.

The electronic device may further include: an input device 1300 and an output device 1400. The processor 1100, the memory 1200, the input device 1300 and the output device 1400 may be connected by a bus or in other ways, and the connection by a bus is taken as an example in FIG. 12.

The input device 1300 can receive input numerical or character information and generate key signal input related to user settings and functional control of the electronic device, and for example, the input device may be a touch screen, keypad, mouse, trackpad, touchpad, pointing stick, one or more mouse buttons, trackballs, joysticks, etc. The output device 1400 may include a display device, auxiliary lighting devices (e.g., LEDs), haptic feedback devices (e.g., vibration motors), and the like. The display device may include, but is not limited to, a liquid crystal display (LCD), a light emitting diode (LED) display, and a plasma display. In some embodiments, the display device may be a touch screen.

Various embodiments of the systems and techniques described herein can be implemented in digital electronic circuitry, integrated circuit systems, application specific ASICs (application specific integrated circuits), computer hardware, firmware, software, and/or combinations thereof. These various embodiments may include being implemented in one or more computer programs executable and/or interpretable on a programmable system including at least one programmable processor. The programmable processor may be a special purpose or general-purpose programmable processor, and may receive data and instructions from a storage system, at least one input device, and at least one output device, and transmit data and instructions to the storage system, the at least one input device, and the at least one output device.

These computational programs (also referred to as programs, software, software applications, or codes) include machine instructions for programmable processors, and may be implemented using high-level procedural and/or object-oriented programming languages, and/or assembly/machine languages calculation program. As used herein, the terms "machine-readable medium" and "computer-readable medium" refer to any computer program product, apparatus, and/or device for providing machine instructions and/or data to a programmable processor (For example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user); and a keyboard and pointing device (e.g., a mouse or trackball) through which a user can provide input to the computer. Other kinds of devices can also be used to provide interaction with the user. For example, the feedback provided to the user can be any form of sensory feedback (e.g., visual feedback, auditory feedback, or tactile feedback); and input from the user can be received in any form (including acoustic input, voice input, or tactile input).

The systems and techniques described herein may be implemented on a computing system that includes back-end components (e.g., as a data server), or a computing system that includes middleware components (e.g., an application server), or a computing system that includes front-end components (e.g., a user computer having a graphical user interface or web browser through which a user may interact with implementations of the systems and techniques described herein), or including any combination of such back-end components, middleware components, or front-end components in a computing system. The components of the system may be interconnected by any form or medium of digital data communication (e.g., a communication network). Examples of communication networks include: Local Area Networks (LANs), Wide Area Networks (WANs), and the Internet.

A computer system can include clients and servers. Clients and servers are generally remote from each other and usually interact through a communication network. The relationship of client and server arises by computer programs running on the respective computers and having a client-server relationship to each other.

According to the data transmission method of the embodiment of the present disclosure, the base station can set the transmission time window, and then can determine the target transmission time unit in the transmission time window, and send the data packet to the user terminal within the target transmission time unit. Therefore, the base station sends data packets to the user terminal in the target transmission time unit within the transmission time window, so that the data packets received by the user terminal are aligned with the corresponding scheduling time domain resources, which can meet the delay requirement of service transmission.

It should be understood that steps may be reordered, added or deleted using the various forms of flow shown above. For example, the steps described in the present disclosure can be performed in parallel, sequentially or in different orders, as long as the desired results of the technical solutions disclosed in the present disclosure can be achieved. No limitation is imposed herein.

The above-mentioned specific embodiments do not constitute a limitation on the protection scope of the present disclosure. It should be understood by those skilled in the art that various modifications, combinations, sub-combinations and substitutions may occur depending on design requirements and other factors. Any modifications, equivalent replacements and improvements made within the spirit and principles of this application shall be included within the protection scope of this application.

What is claimed is:

1. A data transmission method, applied to a base station, comprising:
   setting a transmission time window;
   determining an available transmission time unit in the transmission time window;
   determining a target transmission time unit in the available transmission time unit; and
   sending a data packet to a user terminal in the target transmission time unit.

2. The data transmission method according to claim 1, wherein the transmission time window is applied to semi-static scheduling.

3. The data transmission method according to claim 2, wherein the semi-static scheduling comprises semi-persistent scheduling or configuration grant scheduling.

4. The data transmission method according to claim 1, wherein said setting the transmission time window comprises at least any one of the following:
   determining a cycle of the transmission time window;
   determining a start position of the transmission time window; and
   determining a length of the transmission time window.

5. The data transmission method according to claim 4, wherein the cycle of the transmission time window is determined according to a service cycle.

6. The data transmission method according to claim 1, wherein a length of the transmission time window is less than a length of a cycle of the transmission time window.

7. The data transmission method according to claim 1, wherein at least one of the start position of the transmission time window, the length of the transmission time window, and the available transmission time unit is determined according to at least one factor among link status of core network, server processing capability, service characteristics, service cycle and service delay requirement.

8. The data transmission method according to claim 1, wherein said determining the available transmission time unit in the transmission time window comprises:
   determining a part of transmission time units within the transmission time window as the available transmission time unit.

9. The data transmission method according to claim 1, wherein the method further comprises:
   setting an indication signal according to the target transmission time unit, wherein the indication signal indicates whether the user terminal needs to perform data packet receiving and decoding operations in the available transmission time unit, and the target transmission time unit is the available transmission time unit in which the user terminal needs to perform the data packet receiving and decoding operations; and
   sending the indication signal to the user terminal.

10. The data transmission method according to claim 9, wherein the indication signal is a front indication signal;
   the front indication signal is located in front of the transmission time window, and indicates whether the user terminal needs to perform the data packet receiving and decoding operations in the corresponding single available transmission time unit or all available transmission time units; or
   the front indication signal is located in front of a corresponding single available transmission time unit within the transmission time window, and indicates whether the user terminal needs to perform the data packet receiving and decoding operations in the corresponding single available transmission time unit.

11. The data transmission method according to claim 9, wherein the indication signal is an embedded indication signal;
   the embedded indication signal is located in front of all available transmission time units within the transmission time window, and indicates whether the user terminal needs to perform the packet receiving and decoding operations in a corresponding single available transmission time unit or all the available transmission time unit; or
   the embedded indication signal is located within corresponding single available transmission time unit within the transmission time window, and indicates whether the user terminal needs to perform the data packet receiving and decoding operations in the corresponding single available transmission time unit.

12. The data transmission method according to claim 9, wherein the method further comprises:
sending at least one of the transmission time window, the available transmission time unit, a type of the indication signal, and a location of the indication signal to the user terminal.

13. The data transmission method according to claim 9, wherein the method further comprises:
determining one of a set of preset type of indication signals as the type of the indication signal; or
determining a type of an indication signal specified in a preset protocol as the type of the indication signal.

14. The data transmission method according to claim 9, wherein available transmission time units corresponding to different user terminals or different scheduling tasks of a same user terminal overlap;
locations of the indication signals are different or at least one of contents and locations of the indication signals are different.

15. A data transmission method, applied to a user terminal, comprising:
performing data packet receiving and decoding operations in an available transmission time unit within a transmission time window; and
in response to successfully receiving the data packet, stopping performing the data packet receiving and decoding operations in subsequent available transmission time units within the transmission time window.

16. An electronic device, comprising:
at least one processor; and
a memory communicatively connected to the at least one processor;
wherein, the memory stores instructions executable by the at least one processor, and the instructions are executed by the at least one processor, so that the at least one processor performs the data transmission method according to claim 15.

17. The data transmission method according to claim 15, wherein said performing the data packet receiving and decoding operations in the available transmission time unit within the transmission time window comprises:
receiving an indication signal sent by the base station, and performing the data packet receiving and decoding operations in a target transmission time unit within the transmission time window according to the indication signal, wherein the indication signal indicates whether the user terminal needs to perform the data packet receiving and decoding operations in the available transmission time unit, and the target transmission time unit is the available transmission time unit in which the user terminal needs to perform the data packet receiving and decoding operations within the transmission time window.

18. The data transmission method according to claim 15, wherein the transmission time window is applied to semi-static scheduling, and the semi-static scheduling comprises semi-persistent scheduling or configuration grant scheduling.

19. The data transmission method according to claim 17, wherein the method further comprises:
determining, according to the indication signal, whether a corresponding available transmission time unit is the target transmission time unit; or
determining, according to whether the indication signal is successfully received, whether a corresponding available transmission time unit is the target transmission time unit.

20. An electronic device, comprising:
at least one processor; and
a memory communicatively connected to the at least one processor;
wherein, the memory stores instructions executable by the at least one processor, and the instructions are executed by the at least one processor, so that the at least one processor performs:
setting a transmission time window;
determining an available transmission time unit in the transmission time window;
determining a target transmission time unit in the available transmission time unit; and
sending a data packet to a user terminal in the target transmission time unit.

\* \* \* \* \*